US007574355B2

(12) United States Patent
Grill et al.

(10) Patent No.: US 7,574,355 B2
(45) Date of Patent: Aug. 11, 2009

(54) APPARATUS AND METHOD FOR DETERMINING A QUANTIZER STEP SIZE

(75) Inventors: Bernhard Grill, Lauf (DE); Michael Schug, Erlangen (DE); Bodo Teichmann, Fuerth (DE); Nikolaus Rettelbach, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 294 days.

(21) Appl. No.: 11/514,006

(22) Filed: Aug. 30, 2006

(65) Prior Publication Data

US 2006/0293884 A1 Dec. 28, 2006

Related U.S. Application Data

(63) Continuation of application No. PCT/EP2005/001652, filed on Feb. 17, 2005.

(30) Foreign Application Priority Data

Mar. 1, 2004 (DE) ....................... 10 2004 009 955

(51) Int. Cl.
*G10L 19/14* (2006.01)
*H04B 14/00* (2006.01)

(52) U.S. Cl. .................... 704/230; 704/200.1; 704/226; 375/240.03; 375/245

(58) Field of Classification Search .............. 704/200.1, 704/205, 220, 226, 227, 229, 230; 341/200; 375/240.03, 245
See application file for complete search history.

(56) References Cited

U.S. PATENT DOCUMENTS 4,751,736 A * 6/1988 Gupta et al. ................ 704/230
4,896,362 A * 1/1990 Veldhuis et al. .......... 704/200.1
4,912,763 A * 3/1990 Galand et al. ............... 704/230
5,583,962 A * 12/1996 Davis et al. ................. 704/229
5,664,057 A * 9/1997 Crossman et al. ........... 704/229
5,682,463 A * 10/1997 Allen et al. ................. 704/230
5,692,102 A * 11/1997 Pan ............................ 704/230
5,754,742 A * 5/1998 Astle .......................... 704/230
5,924,064 A * 7/1999 Helf ........................... 704/229
6,064,954 A * 5/2000 Cohen et al. ................ 704/207

(Continued)

OTHER PUBLICATIONS

Abstract WO 2005/083681 A1, Published Sep. 9, 2005, 2 Pages.*

(Continued)

*Primary Examiner*—Martin Lerner
(74) *Attorney, Agent, or Firm*—Michael A. Glenn; Glenn Patent Group

(57) ABSTRACT

For determining a quantizer step size for quantizing a signal including audio or video information, a first quantizer step size as well as an interference threshold are provided. Then, the actual interference introduced by the first quantizer step size is determined and compared with the interference threshold. Despite the fact that the comparison reveals that the actually introduced interference exceeds the threshold, a second, coarser quantizer step size is nevertheless used, which will then be used for quantization if it turns out that the interference introduced by the coarser, second quantizer step size falls below the threshold or falls below the interference introduced by the first quantizer step size. Thus, the quantization interference is reduced while the quantization is coarsened and, thus, the compression gain is increased.

10 Claims, 5 Drawing Sheets

U.S. PATENT DOCUMENTS

| | | | | |
|---|---|---|---|---|
| 6,246,345 | B1 * | 6/2001 | Davidson et al. | 341/51 |
| 6,363,338 | B1 * | 3/2002 | Ubale et al. | 704/200.1 |
| 6,446,037 | B1 * | 9/2002 | Fielder et al. | 704/229 |
| 6,725,192 | B1 * | 4/2004 | Araki | 704/230 |
| 6,950,794 | B1 * | 9/2005 | Subramaniam et al. | 704/200.1 |
| 6,999,919 | B2 * | 2/2006 | Layeghi et al. | 704/200.1 |
| 7,346,514 | B2 | 3/2008 | Herre et al. | |
| 7,454,327 | B1 * | 11/2008 | Neubauer et al. | 704/200.1 |
| 2004/0002859 | A1 | 1/2004 | Liu et al. | |

OTHER PUBLICATIONS

ISO/IEC JTC1/SC29/WG11. Chapter B.2.4 and Chap 10. Study on MPEG-2 AAX 1381807 Draft Technical Corrigendum 1 1998.

ISO/IEC 11172-3. Chapter 1.5.3 and Chapter 2.4.3.4.7.1. 1993.

Quackenbush. Coding of Natural Audio in MPEG-4. IEEE. 1998.

Brandenburg. MP3 and AAC Explained. AES 17th International Conference, Sep. 1999.

Domazet, et al. Advanced Software Implementation of MPEG-4 AAC Audio Encoder. 4th EURASIP Conference. Jul. 2-5, 2003. Zagreb, Croatia.

* cited by examiner

- ERROR WITH QUANTIZATION WITH 4 STAGES (FINE QU.)
0,33-0,25=0,08

- ERROR WITH QUANTIZATION WITH 3 STAGES (COARSE QU.)
0,33-0,33=0,00

APPARATUS AND METHOD FOR DETERMINING A QUANTIZER STEP SIZE

CROSS-REFERENCE TO RELATED APPLICATION

This application is a continuation of copending International Application No. PCT/EP2005/001652, filed Feb. 17, 2005, which designated the United States, and was not published in English and is incorporated herein by reference in its entirety.

BACKGROUND OF THE INVENTION

1. Field of the Invention

The present invention relates to audio coders, and, in particular, to audio coders which are transformation-based, i.e. wherein a conversion of a temporal representation into a spectral representation is performed at the beginning of the coder pipeline.

2. Description of Prior Art

A transformation-based prior art audio coder is depicted in FIG. 3. The coder shown in FIG. 3 is represented in the international standard ISO/IEC 14496-3: 2001 (E), subpart 4, page 4, and is also known as AAC coder in the art.

The prior art coder will be presented below. An audio signal to be coded is supplied in at an input 1000. This audio signal is initially fed to a scaling stage 1002, wherein so-called AAC gain control is conducted to establish the level of the audio signal. Side information from the scaling are supplied to a bit stream formatter 1004, as is represented by the arrow located between block 1002 and block 1004. The scaled audio signal is then supplied to an MDCT filter bank 1006. With the AAC coder, the filter bank implements a modified discrete cosine transformation with 50% overlapping windows, the window length being determined by a block 1008.

Generally speaking, block 1008 is present for the purpose of windowing transient signals with relatively short windows, and of windowing signals which tend to be stationary with relatively long windows. This serves to reach a higher level of time resolution (at the expense of frequency resolution) for transient signals due to the relatively short windows, whereas for signals which tend to be stationary, a higher frequency resolution (at the expense of time resolution) is achieved due to longer windows, there being a tendency of preferring longer windows since they result in a higher coding gain. At the output of filter bank 1006, blocks of spectral values—the blocks being successive in time—are present which may be MDCT coefficients, Fourier coefficients or subband signals, depending on the implementation of the filter bank, each subband signal having a specific limited bandwidth specified by the respective subband channel in filter bank 1006, and each subband signal having a specific number of subband samples.

What follows is a presentation, by way of example, of the case wherein the filter bank outputs temporally successive blocks of MDCT spectral coefficients which, generally speaking, represent successive short-term spectra of the audio signal to be coded at input 1000. A block of MDCT spectral values is then fed into a TNS processing block 1010 (TNS=temporary noise shaping), wherein temporal noise shaping is performed. The TNS technique is used to shape the temporal form of the quantization noise within each window of the transformation. This is achieved by applying a filtering process to parts of the spectral data of each channel. Coding is performed on a window basis. In particular, the following steps are performed to apply the TNS tool to a window of spectral data, i.e. to a block of spectral values.

Initially, a frequency range for the TNS tool is selected. A suitable selection comprises covering a frequency range of 1.5 kHz with a filter, up to the highest possible scale factor band. It shall be pointed out that this frequency range depends on the sampling rate, as is specified in the AAC standard (ISO/IEC 14496-3: 2001 (E)).

Subsequently, an LPC calculation (LPC=linear predictive coding) is performed, to be precise using the spectral MDCT coefficients present in the selected target frequency range. For increased stability, coefficients which correspond to frequencies below 2.5 kHz are excluded from this process. Common LPC procedures as are known from speech processing may be used for LPC calculation, for example the known Levinson-Durbin algorithm. The calculation is performed for the maximally admissible order of the noise shaping filter.

As a result of the LPC calculation, the expected prediction gain PG is obtained. In addition, the reflection coefficients, or Parcor coefficients, are obtained.

If the prediction gain does not exceed a specific threshold, the TNS tool is not applied. In this case, a piece of control information is written into the bit stream so that a decoder knows that no TNS processing has been performed.

However, if the prediction gain exceeds a threshold, TNS processing is applied.

In a next step, the reflection coefficients are quantized. The order of the noise shaping filter used is determined by removing all reflection coefficients having an absolute value smaller than a threshold from the “tail” of the array of reflection coefficients. The number of remaining reflection coefficients is in the order of magnitude of the noise shaping filter. A suitable threshold is 0.1.

The remaining reflection coefficients are typically converted into linear prediction coefficients, this technique also being known as “step-up” procedure.

The LPC coefficients calculated are then used as coder noise shaping filter coefficients, i.e. as prediction filter coefficients. This FIR filter is used for filtering in the specified target frequency range. An autoregressive filter is used in decoding, whereas a so-called moving average filter is used in coding. Eventually, the side information for the TNS tool are supplied to the bit stream formatter, as is represented by the arrow shown between the TNS processing block 1010 and the bit stream formatter 1004 in FIG. 3.

Then, several optional tools which are not shown in FIG. 3 are passed through, such as a long-term prediction tool, an intensity/coupling tool, a prediction tool, a noise substitution tool, until eventually a mid/side coder 1012 is arrived at. The mid/side coder 1012 is active when the audio signal to be coded is a multi-channel signal, i.e. a stereo signal having a left-hand channel and a right-hand channel. Up to now, i.e. upstream from block 1012 in FIG. 3, the left-hand and right-hand stereo channels have been processed, i.e. scaled, transformed by the filter bank, subjected to TNS processing or not, etc., separately from one another.

In the mid/side coder, verification is initially performed as to whether a mid/side coding makes sense, i.e. will yield a coding gain at all. Mid/side coding will yield a coding gain if the left-hand and right-hand channels tend to be similar, since in this case, the mid channel, i.e. the sum of the left-hand and the right-hand channels, is almost equal to the left-hand channel or the right-hand channel, apart from scaling by a factor of ½, whereas the side channel has only very small values since it is equal to the difference between the left-hand and the right-hand channels. As a consequence, one can see that when the left-hand and right-hand channels are approximately the same, the difference is approximately zero, or includes only very small values which—this is the hope—will be quantized to zero in a subsequent quantizer 1014, and thus may be transmitted in a very efficient manner since an entropy coder 1016 is connected downstream from quantizer 1014.

Quantizer 1014 is supplied an admissible interference per scale factor band by a psycho-acoustic model 1020. The quantizer operates in an iterative manner, i.e. an outer iteration loop is initially called up, which will then call up an inner iteration loop. Generally speaking, starting from quantizer step-size starting values, a quantization of a block of values is initially performed at the input of quantizer 1014. In particular, the inner loop quantizes the MDCT coefficients, a specific number of bits being consumed in the process. The outer loop calculates the distortion and modified energy of the coefficients using the scale factor so as to again call up an inner loop. This process is iterated for such time until a specific conditional clause is met. For each iteration in the outer iteration loop, the signal is reconstructed so as to calculate the interference introduced by the quantization, and to compare it with the permitted interference supplied by the psycho-acoustic model 1020. In addition, the scale factors of those frequency bands which after this comparison still are considered to be interfered with are enlarged by one or more stages from iteration to iteration, to be precise for each iteration of the outer iteration loop.

Once a situation is reached wherein the quantization interference introduced by the quantization is below the permitted interference determined by the psycho-acoustic model, and if at the same time bit requirements are met, which state, to be precise, that a maximum bit rate be not exceeded, the iteration, i.e. the analysis-by-synthesis method, is terminated, and the scale factors obtained are coded as is illustrated in block 1014, and are supplied, in coded form, to bit stream formatter 1004 as is marked by the arrow which is drawn between block 1014 and block 1004. The quantized values are then supplied to entropy coder 1016, which typically performs entropy coding for various scale factor bands using several Huffman-code tables, so as to translate the quantized values into a binary format. As is known, entropy coding in the form of Huffman coding involves falling back on code tables which are created on the basis of expected signal statistics, and wherein frequently occurring values are given shorter code words than less frequently occurring values. The entropy-coded values are then supplied, as actual main information, to bit stream formatter 1004, which then outputs the coded audio signal at the output side in accordance with a specific bit stream syntax.

As has already been illustrated, a finer quantizer step size is used in this iterative quantization in the event that the interference introduced by a quantizer step size is larger than the threshold, this being done in the hope that this leads to a reduction of the quantization noise because the quantization performed is finer.

This concept is disadvantageous in that due to the finer quantizer step size, the amount of data to be transmitted naturally increases, and thus, the compression gain decreases.

SUMMARY OF THE INVENTION

It is the object of the present invention to provide a concept for determining a quantizer step size which, on the one hand, introduces low quantization interference, and provides, on the other hand, a high compression gain.

In accordance with a first aspect, the invention provides an apparatus for determining a quantizer step size for quantizing a signal including audio or video information, the apparatus having:

a provider for providing a first quantizer step size and an interference threshold;

a determiner for determining a first interference introduced by the first quantizer step size;

a comparator for comparing the interference introduced by the first quantizer step size with the interference threshold;

a selector for selecting a second quantizer step size which is larger than the first quantizer step size if the first interference introduced exceeds the interference threshold;

a determiner for determining a second interference introduced by the second quantizer step size;

a comparator for comparing the second interference introduced with the interference threshold or the first interference introduced; and a quantizer for quantizing the signal with the second quantizer step size if the second interference introduced is smaller than the first interference introduced or is smaller than the interference threshold.

In accordance with a second aspect, the invention provides a method for determining a quantizer step size for quantizing a signal including audio or video information, the method including the steps of:

providing a first quantizer step size and an interference threshold;

determining a first interference introduced by the first quantizer step size;

comparing the interference introduced by the first quantizer step size with the interference threshold;

selecting a second quantizer step size which is larger than the first quantizer step size if the first interference introduced exceeds the interference threshold;

determining a second interference introduced by the second quantizer step size;

comparing the second interference introduced with the interference threshold or the first interference introduced;

quantizing the signal with the second quantizer step size if the second interference introduced is smaller than the first interference introduced or is smaller than the interference threshold.

In accordance with a third aspect, the invention provides a computer program having a program code for performing the method for determining a quantizer step size for quantizing a signal including audio or video information, the method including the steps of:

- providing a first quantizer step size and an interference threshold;
- determining a first interference introduced by the first quantizer step size;
- comparing the interference introduced by the first quantizer step size with the interference threshold;
- selecting a second quantizer step size which is larger than the first quantizer step size if the first interference introduced exceeds the interference threshold;
- determining a second interference introduced by the second quantizer step size;
- comparing the second interference introduced with the interference threshold or the first interference introduced;

quantizing the signal with the second quantizer step size if the second interference introduced is smaller than the first interference introduced or is smaller than the interference threshold, when the computer program runs on a computer.

The present invention is based on the findings that an additional reduction in the interference power, on the one hand, and at the same time an increase or at least preservation of the coding gain may be achieved in that at least several coarser quantizer step sizes are tried out even when the interference introduced is larger than a threshold, rather than performing finer quantization, as has been done in the prior art. It turned out that even with coarser quantizer step sizes, reductions in the interference introduced by the quantization may be achieved, to be precise in those cases when the coarser quantizer step size "hits" the value to be quantized better than does the finer quantizer step size. This effect is based on the fact that the quantization error depends not only on the quantizer step size, but naturally also on the values to be quantized. If the values to be quantized are in close proximity to the step sizes of the coarser quantizer step size, a reduction in the quantization noise will be achieved while increasing the compression gain (since quantization has been coarser).

The inventive concept is very profitable particularly when very good estimated quantizer step sizes are present already for the first quantizer step size, on the basis of which the threshold comparison is performed. In a preferred embodiment of the present invention, it is therefore preferred to determine the first quantizer step size by means of a direct calculation on the basis of the mean noise energy rather than on the basis of a worst-case scenario. Thus, the iteration loops in accordance with the prior art may already be considerably reduced or may become completely obsolete.

The inventive post-processing of the quantizer step size will then try out, once again only, a still coarser quantizer step size in the embodiment, so as to benefit from the described effect of "improved hitting" of a value to be quantized. If it turns out, subsequently, that the interference obtained by the coarser quantizer step size is smaller than the previous interference or even smaller than the threshold, more iterations may be performed to try out an even coarser quantizer step size. This procedure of coarsening the quantizer step size is continued for such time until the interference introduced increases again. Then, a termination criterion is reached, so that quantization is performed with that stored quantizer step size which has provided the smallest interference introduced, and so that the coding procedure is continued as required.

In an alternative embodiment of the present invention, for estimating the first quantizer step size, an analysis-by-synthesis approach as in the prior art may be performed which is continued for such time until a termination criterion is reached there. Then, the inventive post-processing may be employed to eventually verify whether or not it might be possible to achieve equally good interference results or even better interference results with a coarser quantizer step size. If one finds that a coarser quantizer step size is equally good or even better with regard to the interference introduced, this step size will be used for quantizing. If one finds, however, that the coarser quantization yields no positive effect, one will use, for eventual quantizing, that quantizer step size which was originally determined, for example by means of an analysis/synthesis method.

In accordance with the invention, any quantizer step sizes may thus be employed to perform a first threshold comparison. It is irrelevant whether this first quantizer step size has already been determined by analysis/synthesis schemes or even by means of direct calculation of the quantizer step sizes.

In a preferred embodiment of the present invention, this concept is employed for quantizing an audio signal present in the frequency range. However, this concept may also be employed for quantizing a time domain signal comprising audio and/or video information.

In addition, it shall be pointed out that the threshold used for comparing is a psycho-acoustic or psycho-optical permitted interference, or another threshold which is desired to be fallen below. For example, this threshold may actually be a permitted interference provided by a psycho-acoustic model. This threshold, however, may also be a previously-determined introduced interference for the original quantizer step size, or any other threshold.

It shall be noted that the quantized values need not necessarily be Huffman-coded, but that they may alternatively be coded using another entropy coding, such as an arithmetic coding. Alternatively, the quantized values may also be coded in a binary manner, since this coding, too, has the effect that for transmitting smaller values or values equaling zero, fewer bits are required than are required for transmitting larger values or, generally, values not equaling zero.

For determining the starting values, i.e. the 1 quantizer step size, the iterative approach may preferably be fully or at least largely dispensed with if the quantizer step size is determined from a direct noise energy estimation. Calculating the quantizer step size from an exact noise energy estimate is considerably faster than calculating in an analysis-by-synthesis loop, since the values for the calculation are directly present. It is not necessary to first perform and compare several quantization attempts until a quantizer step size which is favorable for coding is found.

Since, however, the quantizer characteristic curve used is a non-linear characteristic curve, the non-linear characteristic curve must be taken into account in the noise energy estimation. It is no longer possible to use the simple noise energy estimation for a linear quantizer, since it is not accurate enough. In accordance with the invention, a quantizer is used which has the following quantization characteristic curve:

$$y_i = \mathrm{round}\left[\left(\frac{x_i}{q}\right)^{\alpha} + s\right]$$

In the above equation, $x_i$ are the spectral values to be quantized. The starting values are characterized by $y_i$, $y_i$ thus being the quantized spectral values. q is the quantizer step size. Round is the rounding function, which is preferably the nint function, "nint" standing for "nearest integer". The exponent which makes the quantizer a non-linear quantizer is referred to by α, α being different from 1. Typically, the exponent α will be smaller than 1, so that the quantizer has a compressing characteristic. With layer 3, and with AAC, the exponent α equals 0.75. The parameter s is an additive constant which may have any value, but which may also be zero.

In accordance with the invention, the following connection is used for calculating the quantizer step size.

$$\sum_i |\Delta x_i|^2 \approx \frac{q^{2\alpha}}{12\alpha^2} \cdot \sum_i x_i^{2(1-\alpha)}$$

With α equaling ¾, the following equation results:

$$\sum_i |\Delta x_i|^2 \approx \frac{q^{3/2}}{6.75} \cdot \sum_i |x_i|^{1/2}$$

In these equations, the left-hand term stands for the interference THR which is permitted in a frequency band and which is provided by a psycho-acoustic module for a scale factor band with the frequency lines of i equaling $i_1$ to i equaling $i_2$. The above equation enables an almost exact estimation of the interference introduced by a quantizer step size q for a non-linear quantizer having the above quantizer characteristic curve with the exponent α different from 1, wherein the function nint from the quantizer equation performs the actual quantizer equation, which is rounding to the next integer.

It shall be noted that instead of function nint, any rounding function round desired may be used, specifically, for example, also rounding to the next even or the next odd integer, or rounding to the next number of 10, etc. Generally speaking, the rounding function is responsible for mapping a value from a set of values having a specific number of permitted values to a set of values having a smaller specific second number of values.

In a preferred embodiment of the present invention, the quantized spectral values have previously been subjected to TNS processing, and, if what is dealt with are, for example, stereo signals, to mid/side coding, provided that the channels were such that the mid/side coder was activated.

Thus, the scale factor for each scale factor band may be indicated directly and may be fed into a respective audio coder with the connection between the quantizer step size and the scale factor, which is given in accordance with the following equation $$q=2^{(1/4)*scf}.$$

The scale factor results from the following equation.

$$\Leftrightarrow scf = 8.8585 \cdot [\log_{10}(6.75 \cdot THR) - \log_{10}(FFAC)];$$

$$\sum_i |x_i|^{1/2} = FFAC$$

In a preferred embodiment of the present invention, use may also be made of a post-processing iteration based on an analysis-by-synthesis principle, so as to slightly vary the quantizer step size, which has been calculated directly without iteration, for each scale factor band so as to achieve the actual optimum.

Compared to the prior art, however, the already very precise calculation of the starting values enables a very short iteration, although it has turned out that in the vast majority of cases, the downstream iteration may be fully dispensed with.

The preferred concept based on calculating the step size using the mean noise energy thus provides a good and realistic estimation since unlike the prior art, it does not operate with a worst-case scenario, but uses an expected value of the quantization error as a basis and thus enables, with subjectively equivalent quality, more efficient coding of the data with a considerably reduced bit count. In addition, a considerably faster coder may be achieved due to the fact that the iteration may be fully dispensed with and/or that the number of iteration steps may be clearly reduced. This is remarkable, in particular, because the iteration loops in the prior art coder have been essential for the overall time requirement of the coder. Thus, even a reduction by one or fewer iteration steps leads to a considerable overall time saving of the coder.

BRIEF DESCRIPTION OF THE DRAWINGS

These and other objects and features of the present invention will become clear from the following description taken in conjunction with the accompanying drawing, in which.

DESCRIPTION OF PREFERRED EMBODIMENTS

Figure 5:
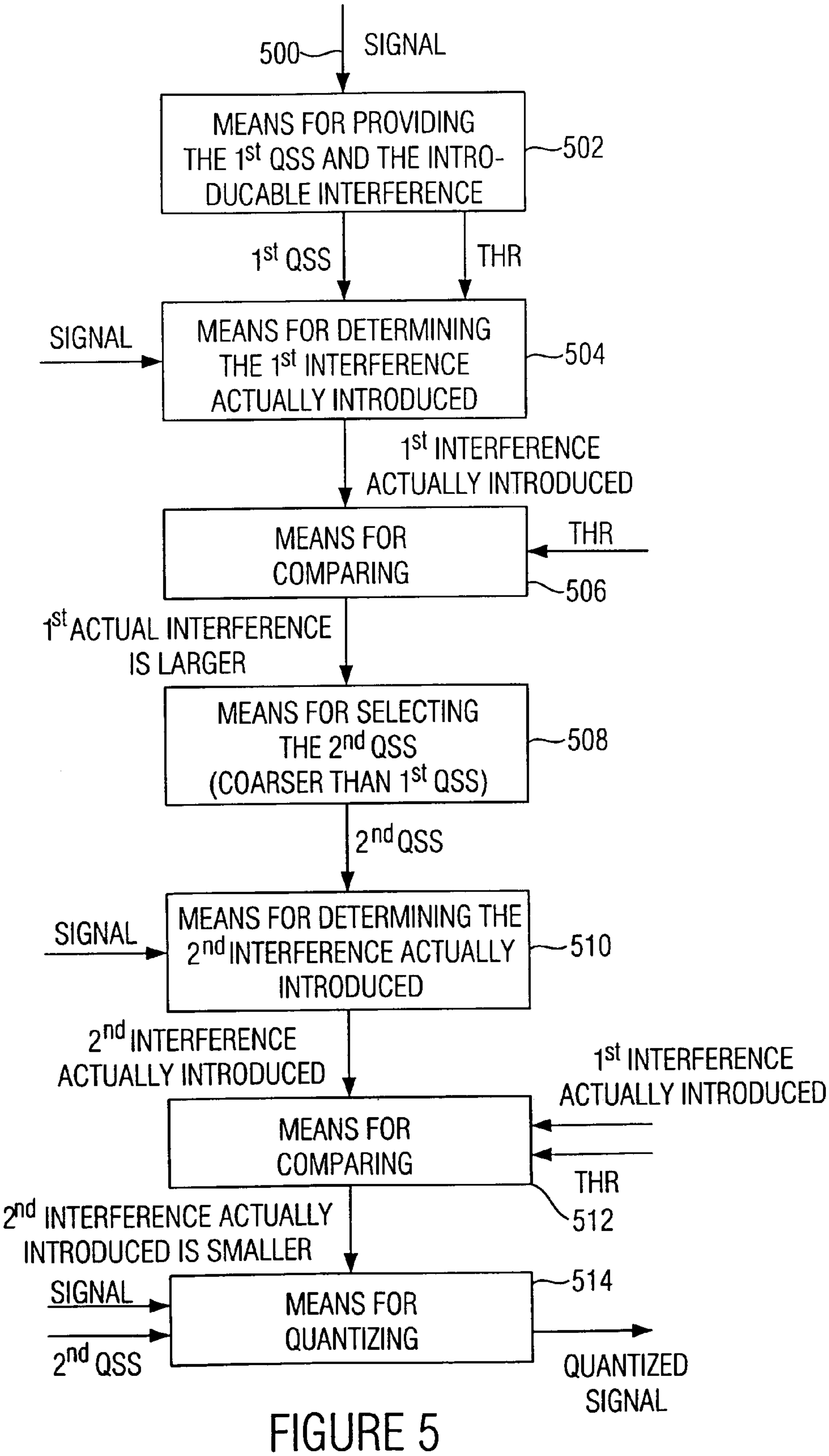
FIG. 5 depicts a block diagram of the inventive apparatus for determining a quantizer step size for quantizing a signal.

The inventive concept will be presented below with reference to FIG. 5. FIG. 5 shows a schematic representation of an apparatus for determining a quantizer step size for quantizing a signal comprising audio or video information and being provided via a signal input 500. The signal is supplied to a means 502 for providing a first quantizer step size (QSS) and for providing an interference threshold which will also be referred to as introducible interference below. It shall be noted that the interference threshold may be any threshold. Preferably, however, it will be a psycho-acoustic or psycho-optically introducible interference, this threshold being selected such that a signal into which the interference has been introduced will still be perceived as not-interfered-with by human listeners or viewers.

The threshold (THR) as well as the first quantizer step size are supplied to a means 504 for determining the actual first interference introduced by the first quantizer step size. Determining the actually introduced interference is preferably conducted by quantizing using the first quantizer step size, by re-quantizing using the first quantizer step size, and by calculating the distance between the original signal and the re-quantized signal. Preferably, when spectral values are being processed, corresponding spectral values of the original signal and of the re-quantized signal are squared so as to then determine the difference of the squares. Alternative methods of determining the distance may be employed.

Means 504 provides a value for a first interference actually introduced by the first quantizer step size. This first interference is supplied, along with threshold THR, to a means 506 for comparing. Means 506 performs a comparison between threshold THR and the first interference actually introduced. If the first interference actually introduced is larger than the threshold, means 506 will activate a means 508 for selecting a second quantizer step size, means 508 being configured to select the second quantizer step size to be coarser, i.e. larger, than the first quantizer step size. The second quantizer step size selected by means 508 is supplied to a means 510 for determining the second interference actually introduced. To this end, means 510 obtains the original signal as well as the second quantizer step size and again performs a quantization using the second quantizer step size, a re-quantization using the second quantizer step size, and a distance calculation between the re-quantized signal and the original signal, so as to supply a means 512 for comparing with a measure of the second interference actually introduced. Means 512 for comparing compares the second interference actually introduced with the first interference actually introduced or with threshold THR. If the second interference actually introduced is smaller than the first interference actually introduced or even smaller than the threshold THR, the second quantizer step size will be used for quantizing the signal.

It shall be noted that the concept depicted in FIG. 5 is only schematic. Naturally, it is not absolutely necessary to provide separate comparison means for performing the comparisons in blocks 506 and 512, but it is also possible to provide one single comparison means which is controlled accordingly. The same applies to means 504 and 510 for determining the interferences actually introduced. They, too, need not necessarily be configured as separate means.

In addition, it shall be noted that the means for quantizing need not necessarily be configured as a means which is separate from means 510. To be precise, the signals with are quantized by the second quantizer step size are typically generated as early as in means 510 when means 510 performs a quantization and re-quantization to determine the interference actually introduced. The quantized values obtained there may also be stored and output as a quantized signal when means 512 for comparing provides a positive result, so that means 514 for quantizing "merges", as it were, with means 510 for determining the second interference actually introduced. In a preferred embodiment of the present invention, threshold THR is the maximally introducible interference determined by way of psychoacoustics, the signal being an audio signal in this case. Threshold THR here is provided by a psycho-acoustic model which operates in a conventional manner and provides, for each scale factor band, an estimated maximum quantization interference introducible into this scale factor band. The maximally introducible interference is based on the masking threshold in that it is identical with the masking threshold or is derived from the masking threshold, in the sense that, for example, coding with a safe spacing is performed such that the introducible interference is smaller than the masking threshold, or that a rather offensive coding in the sense of a bit rate reduction is performed, specifically in the sense that the permitted interference exceeds the masking threshold.

A preferred manner of implementing means 502 for providing the first quantizer step size will be presented below with reference to FIG. 1. In this respect, the functionalities of means 50 of FIG. 2 and of means 502 of FIG. 5 are the same. Preferably, means 502 is configured to have the functionalities of means 10 and of means 12 of FIG. 1. In addition, quantizer 514 in FIG. 5 is configured to be identical with quantizer 14 in FIG. 1 in this example.

Furthermore, a complete procedure which, if the interference introduced exceeds the threshold, will also attempt coarser quantizer step sizes will be presented below with reference to FIG. 2.

Figure 2:
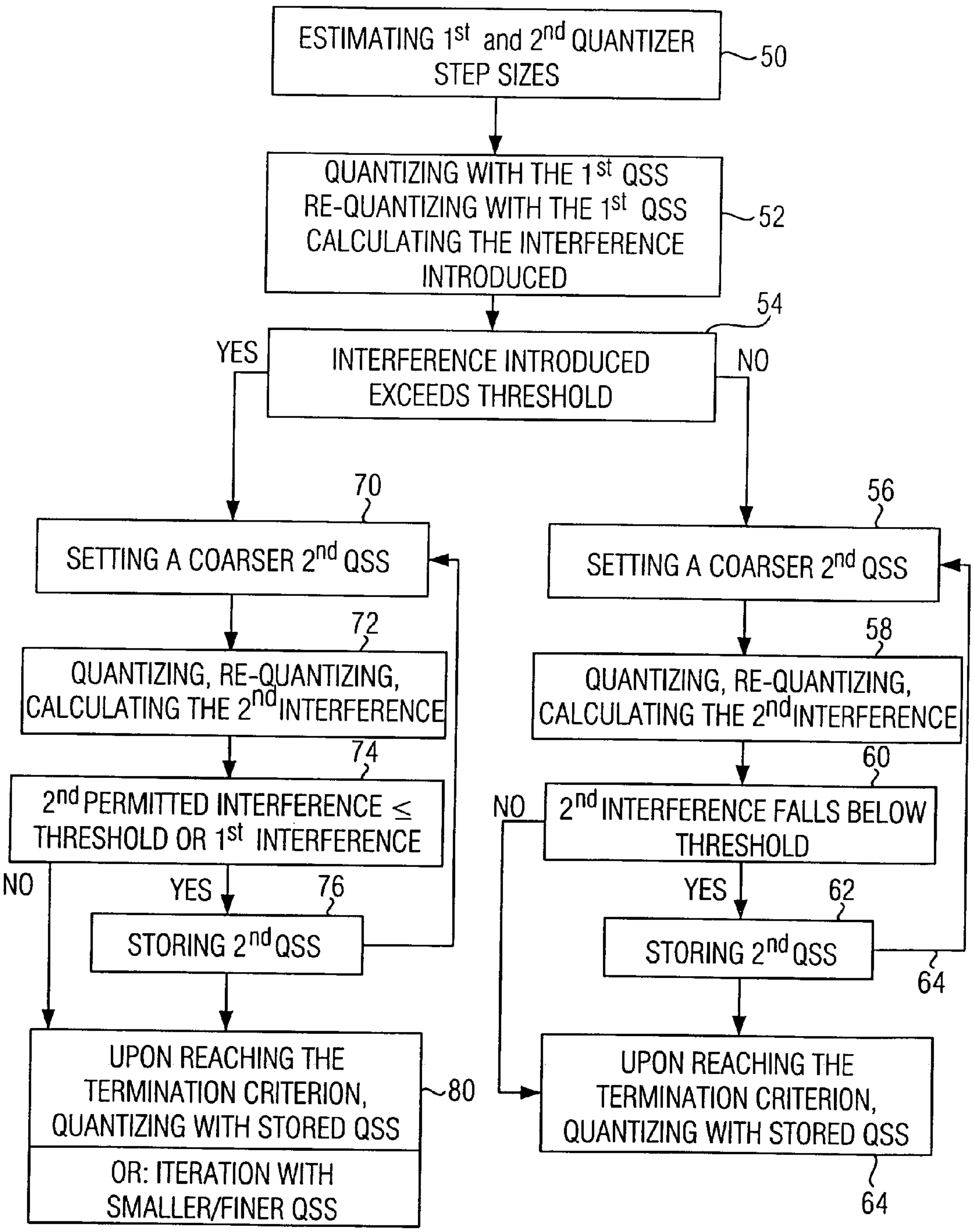
FIG. 2 is a flowchart for representing the post-processing in accordance with a preferred embodiment of the present invention.

In addition, the left-hand branch in FIG. 2, depicting the inventive concept, is extended in that in the event that the interference introduced exceeds the threshold and that the coarsening of the quantizer step size does not yield any effect, and if bit rate requirements are not particularly strict and/or if there is still some space in the "bit savings bank", an iteration is performed using a smaller, i.e. finer quantizer step size.

Eventually, the effect on which the present invention is based will be presented below with reference to FIG. 4, specifically the effect that despite a coarsening of the quantizer step size, a reduced quantization noise and, associated therewith, an increase in the compression gain may be obtained.

Figure 1:
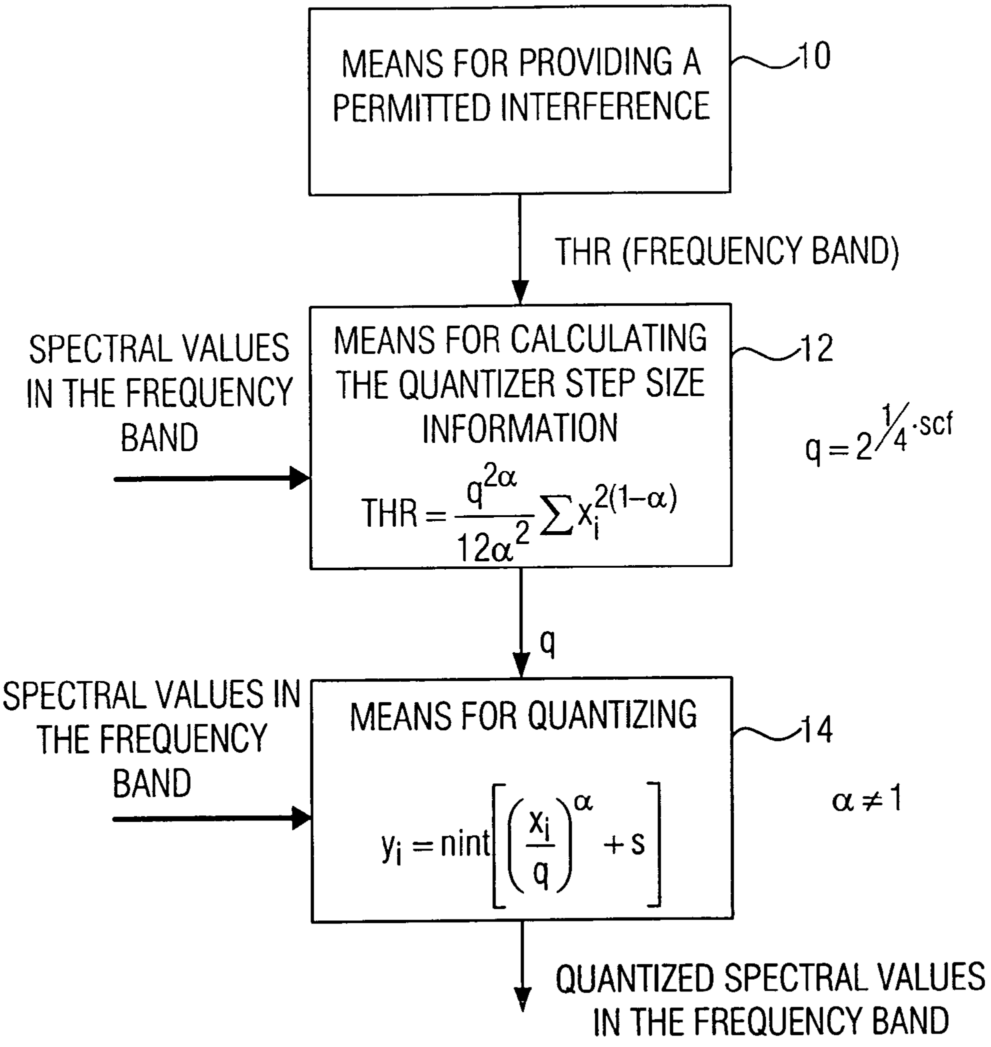
FIG. 1 is a block diagram of an apparatus for determining a quantized audio signal.
Figure 3:
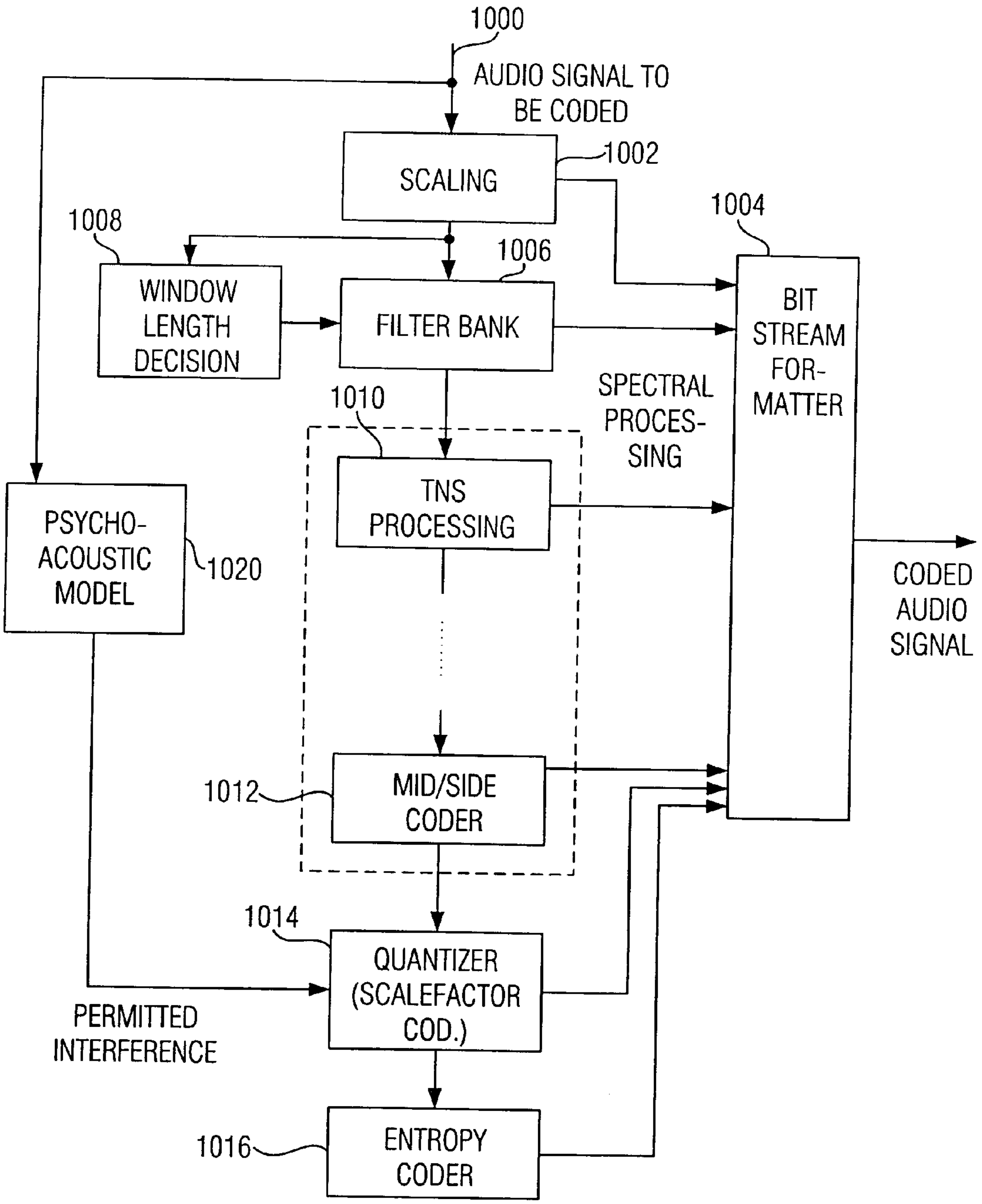
FIGURE 3 (PRIOR ART)
FIG. 3 depicts a block diagram of a prior art coder in accordance with the AAC standard.

FIG. 1 shows an apparatus for determining a quantized audio signal which is given as a spectral representation in the form of spectral values. It shall be noted, in particular, that in the event that—with reference to FIG. 3—no TNS processing and no mid/side coding has been performed, the spectral values are directly the starting values of the filter bank. If, however, only TNS processing, but no mid/side coding is performed, the spectral values fed into quantizer 1015 are spectral residual values as are formed from TNS prediction filtering.

If TNS processing including a mid/side coding is employed, the spectral values fed into the inventive apparatus are spectral values of a mid channel, or spectral values of a side channel.

To start with, the present invention includes a means for providing a permitted interference, indicated by 10 in FIG. 1. The psycho-acoustic model 1020 shown in FIG. 3 which typically is configured to provide a permitted interference or threshold, also referred to as THR, for each scale factor band, i.e. for a group of several spectral values which are spectrally adjacent to one another, may serve as the means for providing a permitted interference. The permitted interference is based on the psycho-acoustic masking threshold and indicates the amount of energy that may be introduced into an original audio signal without the interference energy being perceived by the human ear. In other words, the permitted interference is the signal portion artificially introduced (by the quantization) which is masked by the actual audio signal.

Means 10 is depicted to calculate the permitted interference THR for a frequency band, preferably a scale factor band, and to supply this to a downstream means 12. Means 12 serves to calculate a piece of quantizer step size information for the frequency band for which the permitted interference THR has been indicated. Means 12 is configured to supply the piece of quantizer step size information q to a downstream means 14 for quantizing. Means 14 for quantizing operates in accordance with the quantization specification drawn in block 14, the quantizer step size information being used, in the case shown in FIG. 1, to initially divide a spectral value $x_i$ by the value of q, and to then exponentiate the result with the exponent $\alpha$ unequal to 1, and to then add an additive factor s, as the case may be.

Subsequently, this result is supplied to a rounding function which, in the embodiment shown in FIG. 1, selects the next integer. In accordance with the definition, the integer may be generated again by cutting off digits behind the decimal point, i.e. by "always rounding down". Alternatively, the next integer may also be generated by rounding down to 0.499 and by rounding up from 0.5. As another alternative, the next integer may be determined by "rounding up", depending on the individual implementation. However, instead of the nint function, any other rounding function may be employed which, generally speaking, maps a value, which is to be rounded, from a first, larger set of values into a second, smaller set of values.

The quantized spectral value will then be present in the frequency band at the output of means 14. As may be seen from the equation depicted in block 14, means 14 will naturally also be supplied, beside the quantizer step size q, with the spectral value to be quantized in the frequency band contemplated.

It shall be noted that means 12 need not necessarily directly calculate quantizer step size q, but that as alternative quantizer step size information, the scale factor as is used in prior-art transformation-based audio coders may also be calculated. The scale factor is linked to the actual quantizer step size via the relation depicted to the right of block 12 in FIG. 1. If the means for calculating is further configured to calculate, as quantizer step size information, scale factor scf, this scale factor will be supplied to means 14 for quantizing, which means will then use, in block 14, the value of $2^{1/4\,scf}$ for the quantization calculation instead of value q.

A derivation of the form given in block 12 will be given below.

As has been set forth, the exponential-law quantizer as is depicted in block 14 obeys the following relation:

$$y_i = \mathrm{round}\left[\left(\frac{x_i}{q}\right)^{\alpha} + s\right]$$

The inverse operation will be presented as follows:

$$x_i' = y_i^{1/\alpha} \cdot q$$

This equation thus represents the operation required for re-quantization, wherein $y_i$ is a quantized spectral value, and wherein $x_i'$ is a re-quantized spectral value. Again, q is the quantizer step size which is associated with the scale factor via the relation shown in FIG. 1 to the right of block 12.

As has been expected, in the event that α equals 1, the result is consistent with this equation.

If the above equation is summed up over a vector of the spectral values, the total noise power in a band determined by index i is given as follows:

$$\sum_i |\Delta x_i|^2 \approx \frac{q^{2\alpha}}{12\alpha^2} \cdot \sum_i x_i^{2(1-\alpha)}$$

In summary, the expected value of the quantization noise of a vector is determined by the quantizer step size q and a so-called form factor describing the distribution of amounts of the components of the vector.

The form factor, which is the far-right term in the above equation, depends on the actual input values and need only be calculated once, even if the above equation is calculated for interference levels THR desired to differing degrees.

As has already been set forth, this equation with a equaling ¾ is simplified as follows:

$$\sum_i |\Delta x_i|^2 \approx \frac{q^{3/2}}{6.75} \cdot \sum_i |x_i|^{1/2}$$

The left-hand side of this equation is thus an estimate of the quantization noise energy which, in a borderline case, conforms with the permitted noise energy (threshold).

Thus, the following approach will be made:

$$\sum_i |\Delta x_i|^2 = THR$$

The sum across the roots of the frequency lines in the right-hand part of the equation corresponds to a measure of the uniformity of the frequency lines and is known as the form factor preferably as early as in the encoder:

$$\sum_i |x_i|^{1/2} = FFAC$$

Thus, the following results:

$$THR \approx \frac{q^{3/2}}{6.75} \cdot FFAC$$

q here corresponds to the quantizer step size. With AAC, it is specified as:

$$q = 2^{(1/4) * scf}$$

scf is the scale factor. If the scale factor is to be determined, the equation may be calculated as follows on the basis of the relation between the step size and the scale factor:

$$THR \approx \frac{2^{(3/8)scf}}{6.75} \cdot FFAC$$
$$\Leftrightarrow 2^{(3/8)scf} = \frac{6.75 \cdot THR}{FFAC}$$
$$\Leftrightarrow scf = \frac{8}{3}\log_2\left(\frac{6.75 \cdot THR}{FFAC}\right)$$
$$\Leftrightarrow scf = \frac{8}{3\log_{10}2}[\log_{10}(6.75 \cdot THR) - \log_{10}(FFAC)]$$
$$\Leftrightarrow scf = 8.8585 \cdot [\log_{10}(6.75 \cdot THR) - \log_{10}(FFAC)]$$

The present invention thus provides a closed connection between the scale factors scf for a scale factor band which has a specific form factor and for which a specific interference threshold THR, which typically originates from the psychoacoustic model, is given.

As has already been set forth, calculating the step size using the mean noise energy provides a better estimate, since the basis used is the expected value of the quantization error rather than a worst-case scenario.

Thus, the inventive concept is suitable for determining the quantizer step size and/or, in equivalence thereto, of the scale factor for a scale factor band without any iterations.

Nevertheless, post-processing as will be represented below by means of FIG. 2 can also be performed if the calculating time requirements are not very strict. In a first step in FIG. 2, the first quantizer step size is estimated (step 50). Estimating the first quantizer step size (QSS) is performed using the procedure depicted by means of FIG. 1. Subsequently, a quantization using the first quantizer step size is performed in a step 52, preferably in accordance with the quantizer as is depicted using block 14 in FIG. 1. Subsequently, the values obtained with the first quantizer step size are re-quantized so as to then calculate the interference introduced. Thereupon, verification is made in a step 54 as to whether the interference introduced exceeds the predefined threshold.

It shall be pointed out that the quantizer step size q (or scf) which has been calculated by the connection represented in block 12 is an approximation. If the connection given in block 12 of FIG. 1 were actually exact, it should be established, in block 54, that the interference introduced exactly corresponds to the threshold. Due to the approximation nature of the connection in block 12 of FIG. 1, however, the interference introduced may exceed of fall below threshold THR.

In addition, it shall be noted that the deviation from the threshold will not be particularly large, even though it will nevertheless be present. If one finds, in step 54, that using the first quantizer step size, the interference introduced falls below the threshold, i.e. if the question in step 54 is answered in the negative, the right-hand branch in FIG. 2 will be taken. If the interference introduced falls below the threshold, this means that the estimate in block 12 in FIG. 1 was too pessimistic, so that in a step 56, a quantizer step size coarser than the second quantizer step size is set.

The degree to which the second quantizer step size is coarser, in comparison, than the first quantizer step size, may be selected. However, it is preferred to take relatively small increments, since the estimate in block 50 will already be relatively exact.

Using the second coarser (larger) quantizer step size, a quantization of the spectral values, a subsequent re-quantization and a calculation of the second interference corresponding to the second quantizer step size are performed in a step 58.

In a step (60), verification is then made as to whether the second interference, which corresponds to the second quantizer step size, still falls below the original threshold. If this is so, the second quantizer step size is stored (62), and a new iteration is started so as to set an even coarser quantizer step size in a step (56). Then, step 60 and, as the case may be, step 62 is again performed using the even coarser quantizer step size so as to again start a new iteration. If one finds, during an iteration in step 60, that the second interference does not fall below the threshold, i.e. exceeds the threshold, a termination criterion has been reached, and upon reaching the termination criterion, quantization is performed (64) using the quantizer step size that has been stored last.

Since the first estimated quantizer step size already was a relatively good value, the number of iterations as compared with poorly estimated starting values will be reduced, which will lead to significant savings in calculation time when coding, since the iterations for calculating the quantizer step size take up the largest proportion of calculating time of the coder.

An inventive procedure which is used when the interference introduced actually exceeds the threshold will be represented below with reference to the left-hand branch in FIG. 2.

Despite the fact that the interference introduced already exceeds the threshold, an even coarser second quantizer step size is set in accordance with the invention (70), a quantization, re-quantization and calculation of the second noise interference which corresponds to the second quantizer step size then being performed in a step 72. Thereafter, verification is made in a step 74 as to whether the second noise interference now falls below the threshold. If this is so, the question in step 74 is answered with "yes", and the second quantizer step size is stored (76). If, however, one finds that the second noise interference exceeds the threshold, either a quantization is performed using the stored quantizer step size, or, if no better second quantizer step size has been stored, an iteration is passed through, wherein, like in the prior art, a finer second quantizer step size is selected to "push" the interference introduced below the threshold.

What will follow is a discussion of why an improvement may still be achieved when an even coarser quantizer step size is used, particularly when the interference introduced exceeds the threshold. Up to now, one has always operated on the assumption that a finer quantizer step size leads to a smaller quantization energy introduced, and that a larger quantizer step size leads to a higher quantization interference introduced. On average, this may be true, but it is not always true, and the opposite will be true, in particular, for rather thinly populated scale factor bands and, in particular, when the quantizer has a non-linear characteristic curve. One has found, in accordance with the invention, that in a number of cases which is not to be underestimated, a coarser quantizer step size leads to a smaller interference introduced. This can be traced back to the fact that there may also be the case when a coarser quantizer step size hits a spectral value to be quantized better than a finer quantizer step size, as will be set forth using the below example with reference to FIG. 4.

Figure 4:
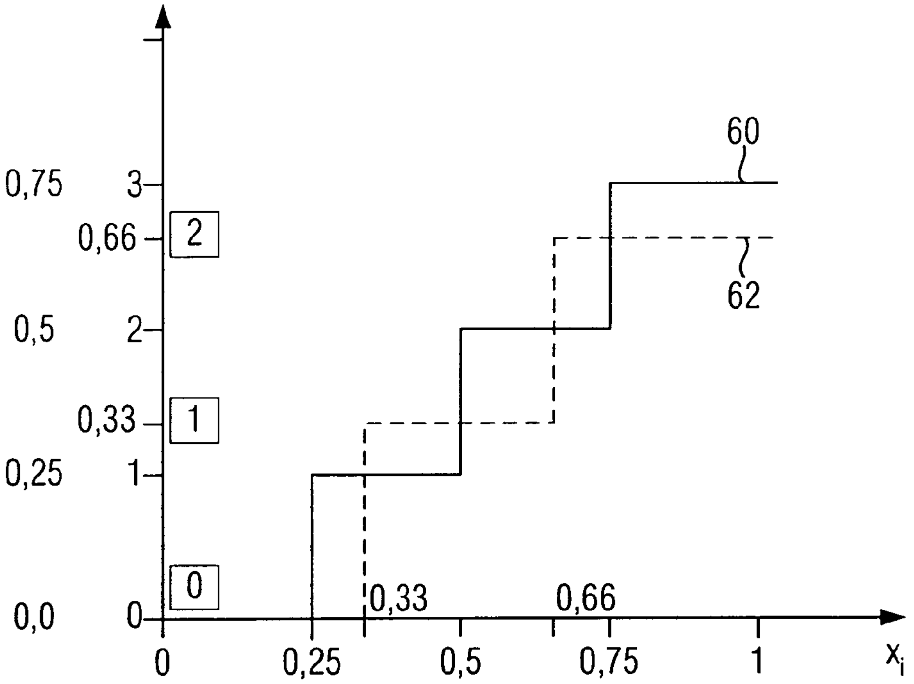
FIG. 4 is a representation of the reduction of the quantization interference by a coarser quantizer step size.

By way of example, FIG. 4 shows a quantization characteristic curve (60) which provides four quantization stages 0, 1, 2, 3, when input signals between 0 and 1 are quantized. The quantized values correspond to 0.0, 0.25, 0.5, 0.75. In comparison, a different, coarser quantization characteristic curve is drawn in dotted lines in FIG. 4 (62), which only has three quantization stages which correspond to the absolute values of 0.0, 0.33, 0.66. Thus, in the first case, i.e. with the quantizer characteristic curve 60, the quantizer step size equals 0.25, whereas in the second case, i.e. with the quantizer characteristic curve 62, the quantizer step size equals 0.33. The second quantizer characteristic curve (62) therefore has a coarser quantizer step size than the first quantizer characteristic curve (60) which is to represent a fine quantization characteristic curve. If the value $x_i$=0.33, which is to be quantized, is contemplated, one can see from FIG. 4 that the error in the quantization using the fine quantizer having four stages equals the difference between 0.33 and 0.25, and thus is 0.08. By contrast, the error in the quantization using three stages equals zero due to the fact that a quantizer stage exactly "hits", as it were, the value to be quantized.

It may therefore be seen from FIG. 4 that a coarser quantization may lead to a smaller quantization error than a fine quantization.

In addition, a coarser quantization is the deciding factor for a smaller starting bit rate being required, since the possible states are only three states, i.e. 0, 1, 2, unlike the case of the finer quantizer, wherein four stages 0, 1, 2, 3 must be signaled. In addition, the coarser quantizer step size has the advantage that more values tend to be "quantized away" to 0 than with a finer quantizer step size, wherein fewer values are quantized away to "0". Even though, when several spectral values in one scale factor band are contemplated, "quantizing to 0" leads to an increase in the quantization error, this need not necessarily become problematic, since the coarser quantizer step size may hit other, more important spectral values in a more exact manner, so that the quantization error is cancelled out and even over-compensated for by the coarser quantization of the other spectral values, a smaller bit rate occurring at the same time.

In other words, the coder result achieved is "better", all in all, since the inventive concept achieves a smaller number of states to be signaled and, at the same time, improved "hitting" of the quantization stages. In accordance with the invention, as has been represented in the left-hand branch of FIG. 2, a still coarser quantizer step size is attempted, starting from estimated values (step 50 in FIG. 2), when the interference introduced exceeds the threshold, so as to benefit from the effect represented using FIG. 4. In addition, it has turned out that this effect is even more significant with non-linear quantizers than in the case, drawn in FIG. 4, of two linear quantizer characteristic curves.

The presented concept of quantizer step size post-processing and/or scale factor post-processing thus serves to improve the result of the scale factor estimator.

Starting from the quantizer step sizes determined in the scale factor estimator (50 in FIG. 2), new quantizer step sizes which are as large as possible, and for which the error energy falls below the predefined threshold value, are determined in the analysis-by-synthesis step.

Therefore, the spectrum is quantized with the quantizer step sizes calculated, and the energy of the error signal, i.e. preferably the square sum of the difference of original and quantized spectral values, is determined. Alternatively, for error determination, a corresponding time signal may also be used, even though the use of spectral values is preferred.

The quantizer step size and the error signal are stored as the best result obtained so far. If the interference calculated exceeds a threshold value, the following approach is adopted:

The scale factor within a predefined range is varied around the value originally calculated, use being also made, in particular, of coarser quantizer step sizes (70).

For each new scale factor, the spectrum is again quantized, and the energy of the error signal is calculated. If the error signal is smaller than the smallest that has so far been calculated, the current quantizer step size is latched, along with the energy of the associated error signal, as the best result obtained so far.

In accordance with the invention, not only relatively small, but also relatively large scaling factors are taken into account here, in order to benefit from the concept described with reference to FIG. 4, particularly when the quantizer is a non-linear quantizer.

If the interference calculated, however, falls below the threshold value, i.e. if the estimation in step 50 was too pessimistic, the scale factor will be varied within a predefined range around the originally calculated value.

For each new scale factor, the spectrum is re-quantized, and the energy of the error signal is calculated.

If the error signal is smaller than the smallest that has been calculated so far, the current quantizer step size is latched, along with the energy of the associated error signal, as the best result obtained so far.

However, only relatively coarse scaling factors are taken into account here so as to reduce the number of bits required for coding the audio spectrum.

Depending on the circumstances, the inventive method may be implemented in hardware or in software. The implementation may be effected on a digital storage medium, in particular a disk or CD with electronically readable control signals which may cooperate with a programmable computer system such that the method is performed.

Generally, the invention thus consists in a computer program product having a program code, stored on a machine-readable carrier, for performing the inventive method, when the computer program product runs on a computer. In other words, the invention may thus be realized as a computer program having a program code for performing the method, when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An apparatus for determining a quantizer step size for quantizing a signal comprising audio or video information, the apparatus comprising:

a provider for providing a first quantizer step size and an interference threshold;

wherein the provider is configured to calculate the first quantizer step size in accordance with the following equation:

$$\sum_i |\Delta x_i|^2 \approx \frac{q^{2\alpha}}{12\alpha^2} \cdot \sum_i x_i^{2(1-\alpha)};$$

a determiner for determining a first interference introduced by the first quantizer step size;

a comparator for comparing the interference introduced by the first quantizer step size with the interference threshold;

a selector for selecting a second quantizer step size which is larger than the first quantizer step size if the first interference introduced exceeds the interference threshold;

a determiner for determining a second interference introduced by the second quantizer step size;

a comparator for comparing the second interference introduced with the interference threshold or the first interference introduced; and a quantizer for quantizing the signal comprising audio or video information with the second quantizer step size if the second interference introduced is smaller than the first interference introduced or is smaller than the interference threshold so that a quantized signal comprising audio or video information is obtained, wherein the quantizer is configured to quantize in accordance with the following equation:

$$y_i = \text{round}\left[\left(\frac{x_i}{q}\right)^\alpha + s\right]$$

wherein $x_i$ is a spectral value to be quantized, wherein q represents a quantizer step size information, wherein s is a figure differing from or equaling zero, wherein a is an exponent different from "1", wherein round is a rounding function which maps a value from a first, larger range of values to a value within a second, smaller range of values, wherein is the permitted interference, $$\sum_i |\Delta x_i|^2$$

and wherein $_i$ is a run index for spectral values in the frequency band.

2. The apparatus as claimed in claim 1, wherein the signal is an audio signal and comprises spectral values of a spectral representation of the audio signal, and wherein the provider is configured as a psycho-acoustic model which calculates a permitted interference for a frequency band on the basis of a psycho-acoustic masking threshold.

3. The apparatus as claimed in claim 1, wherein the determiner for determining the first interference introduced, or the calculator for calculating the second interference introduced is configured to quantize using a quantizer step size, to re-quantize using the quantizer step size, and to calculate a distance between the re-quantized signal and the signal so as to obtain the interference introduced.

4. The apparatus as claimed in claim 1, wherein the selector is further configured to select a larger quantizer step size when the interference introduced is smaller than the permitted interference.

5. The apparatus as claimed in claim 1, wherein the provider is configured to provide the first quantizer step size as a result of an analysis/synthesis determination.

6. The apparatus as claimed in claim 1, wherein the selector is configured to alter a quantizer step size for one frequency band independently of a quantizer step size for another frequency band.

7. The apparatus as claimed in claim 1, wherein the provider is configured to determine the first quantizer step size as a result of a preceding iteration step with a coarsening of the quantizer step size, and wherein the interference threshold is an interference introduced in the preceding iteration step for determining the first quantizer step size.

8. Apparatus of claim 1, in which the rounding function is implemented as a nearest integer function.

9. A method for determining a quantizer step size for quantizing a signal comprising audio or video information, the method comprising:

providing a first quantizer step size and an interference threshold by calculating the first quantizer step size in accordance with the following equation:

$$\sum_i |\Delta x_i|^2 \approx \frac{q^{2\alpha}}{12\alpha^2} \cdot \sum_i x_i^{2(1-\alpha)};$$

determining a first interference introduced by the first quantizer step size;

comparing the interference introduced by the first quantizer step size with the interference threshold;

selecting a second quantizer step size which is larger than the first quantizer step size if the first interference introduced exceeds the interference threshold;

determining a second interference introduced by the second quantizer step size;

comparing the second interference introduced with the interference threshold or the first interference introduced;

quantizing the signal comprising audio or video information with the second quantizer step size if the second interference introduced is smaller than the first interference introduced or is smaller than the interference threshold, so that a quantized signal comprising audio or video information is obtained wherein the quantizing is performed in accordance with the following equation:

$$y_i = \mathrm{round}\left[\left(\frac{x_i}{q}\right)^{\alpha} + s\right]$$

wherein $x_1$ is a spectral value to be quantized, wherein q represents a quantizer step size information, wherein s is a figure differing from or equaling zero, wherein a is an exponent different from "1", wherein round is a rounding function which maps a value from a first, larger range of values to a value within a second, smaller range of values, wherein $$\sum_i |\Delta x_i|^2$$

is the permitted interference, and wherein $_1$ is a run index for spectral values in the frequency band.

10. A computer readable medium having stored thereon a computer program having a program code for performing the method for determining a quantizer step size for quantizing a signal comprising audio or video information, the method comprising:

providing a first quantizer step size and an interference threshold, by calculating the quantizer step size in accordance with the following equation:

$$\sum_i |\Delta x_i|^2 \approx \frac{q^{2\alpha}}{12\alpha^2} \cdot \sum_i x_i^{2(1-\alpha)};$$

determining a first interference introduced by the first quantizer step size;

comparing the interference introduced by the first quantizer step size with the interference threshold;

selecting a second quantizer step size which is larger than the first quantizer step size if the first interference introduced exceeds the interference threshold;

determining a second interference introduced by the second quantizer step size;

comparing the second interference introduced with the interference threshold or the first interference introduced;

quantizing the signal comprising audio or video information with the second quantizer step size if the second interference introduced is smaller than the first interference introduced or is smaller than the interference threshold, so that a quantized signal comprising audio or video information is obtained wherein the quantizing is performed in accordance with the following equation:

$$y_i = \mathrm{round}\left[\left(\frac{x_i}{q}\right)^{\alpha} + s\right]$$

wherein $x_i$ is a spectral value to be quantized, wherein q represents a quantizer step size information, wherein s is a figure differing from or equaling zero, wherein a is an exponent different from "1", wherein round is a rounding function which maps a value from a first, larger range of values to a value within a second, smaller range of values, wherein $$\sum_i |\Delta x_i|^2$$

is the permitted interference, and wherein $_i$ is a run index for spectral values in the frequency band, when the computer program runs on a computer.

* * * * *